(12) United States Patent
Thorell

(10) Patent No.: US 8,274,577 B2
(45) Date of Patent: Sep. 25, 2012

(54) METHODS OF PROCESSING DIGITAL IMAGE AND/OR VIDEO DATA INCLUDING LUMINANCE FILTERING BASED ON CHROMINANCE DATA AND RELATED SYSTEMS AND COMPUTER PROGRAM PRODUCTS

(75) Inventor: Per Thorell, Lund (SE)

(73) Assignee: Telfoanktiebolaget L M Ericsson (Publ), Stockholm (SE)

( * ) Notice: Subject to any disclaimer, the term of this patent is extended or adjusted under 35 U.S.C. 154(b) by 1175 days.

(21) Appl. No.: 11/846,778

(22) Filed: Aug. 29, 2007

(65) Prior Publication Data

US 2007/0291141 A1 Dec. 20, 2007

Related U.S. Application Data

(62) Division of application No. 10/701,730, filed on Nov. 5, 2003, now abandoned.

(51) Int. Cl.
*H04N 5/228* (2006.01)
*G06K 9/00* (2006.01)

(52) U.S. Cl. ..................... 348/222.1; 382/165

(58) Field of Classification Search ................. 348/241, 348/252, 255, 230.1, 237, 266
See application file for complete search history.

(56) References Cited

U.S. PATENT DOCUMENTS

| | | | |
|---|---|---|---|
| 5,533,140 A | 7/1996 | Sirat et al. | |
| 6,404,395 B1 * | 6/2002 | Masuda | 343/702 |
| 6,480,538 B1 * | 11/2002 | Trovato | 375/240.01 |
| 7,280,703 B2 * | 10/2007 | Gallagher et al. | 382/260 |
| 7,606,435 B1 * | 10/2009 | Dumitras et al. | 382/243 |
| 2003/0021343 A1 | 1/2003 | Travato | |
| 2003/0228064 A1 * | 12/2003 | Gindele et al. | 382/260 |
| 2005/0094003 A1 | 5/2005 | Thorell | |

FOREIGN PATENT DOCUMENTS

EP 0 621 732 A 10/1994

OTHER PUBLICATIONS

Gomila, C. et al. SEI Message for Film Grain Encoding. Joint Video Team (JVT) of ISO/IEC MPEG & ITU-T VCEG. $8^{th}$ Meeting Geneva, CH, May 23-27, 2003, XP002-308742.

* cited by examiner

*Primary Examiner* — Albert Cutler

(57) ABSTRACT

Digital image and/or video data is processed wherein a frame of the data comprises a plurality of rows and columns of pixels with data for each pixel including a luminance value and a chrominance value. Chrominance values and luminance values may be received for a current pixel and at least one adjacent pixel, and the chrominance values of the current pixel and the at least one adjacent pixel may be compared. The luminance value of the current pixel may be filtered wherein a strength of filtering the luminance value is based on the comparison of the chrominance values of the current and at least one adjacent pixels.

18 Claims, 9 Drawing Sheets

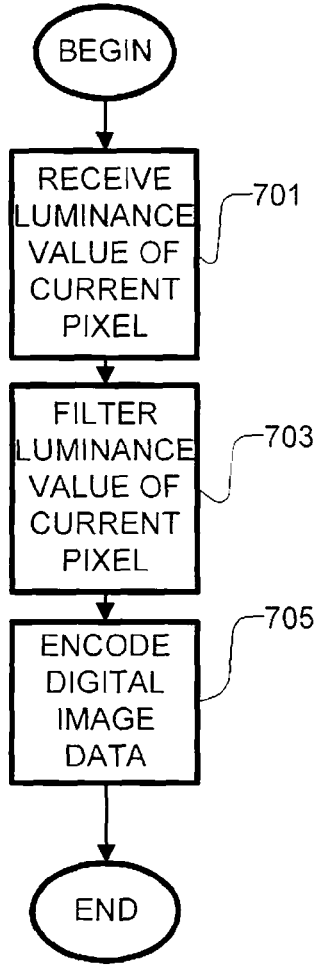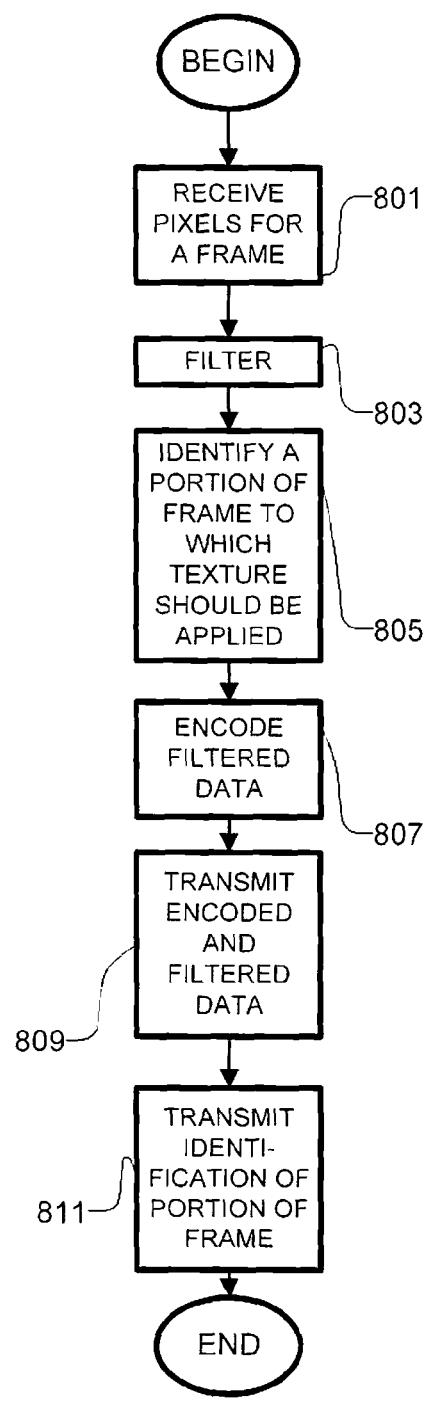

METHODS OF PROCESSING DIGITAL IMAGE AND/OR VIDEO DATA INCLUDING LUMINANCE FILTERING BASED ON CHROMINANCE DATA AND RELATED SYSTEMS AND COMPUTER PROGRAM PRODUCTS

CROSS-REFERENCE TO RELATED APPLICATIONS

This application is a divisional application of U.S. application Ser. No. 10/701,730 filed Nov. 5, 2003, now abandoned, the disclosure of which is fully incorporated herein by reference. In response to a Restriction Requirement dated Mar. 5, 2007, the Applicant provisionally elected, without traverse, claims 29-34 for further prosecution and cancelled the claims present in this application.

FIELD OF THE INVENTION

The present invention relates to the field of image and/or video, and more particular to processing of digital image and/or video data and related systems and computer program products.

BACKGROUND OF THE INVENTION

A pixel adaptive noise reduction filter for digital video is discussed in U.S. Pat. No. 5,959,693 to Siu-Wai Wu et al. As discussed in the abstract of Wu et al., a current pixel of a video image is adaptively filtered to provide stronger filtering wherein there is a high likelihood that noise is present. Weaker filtering is provided when the presence of a color and/or brightness edge is likely in the video image. Each pixel has luminance and chrominance amplitude values. In a filtering method, a current pixel is intermediate to first and second pixels in the video frame. Difference signals are determined based on the amplitude difference between the current pixel and first and second adjacent pixels. A plurality of available filters provide successively stronger filtering of the current pixel amplitude. One of the filters is selected for filtering the current pixel according to the difference signals. Secondary difference signals which indicate the amplitude difference between the current pixel and pixels which are adjacent to the first and second pixels are also considered in the selection process. The selection process may further be biased by a user-selectable control word. The scheme may also provide temporal filtering with successive video frames or images. Filtering with pixel interpolation may also be used. The disclosure of U.S. Pat. No. 5,959,693 is hereby incorporated herein in its entirety by reference.

SUMMARY OF THE INVENTION

According to embodiments of the present invention, methods may be provided for processing digital image and/or video data wherein a frame of the data comprises a plurality of rows and columns of pixels with data for each pixel including a luminance value and a chrominance value. More particularly, chrominance values and luminance values may be received for a current pixel and at least one adjacent pixel, and the chrominance values of the current pixel and the at least one adjacent pixel may be compared. The luminance value of the current pixel may be filtered wherein a strength of filtering the luminance value is based on the comparison of the chrominance values of the current pixel and at least one adjacent pixel.

Filtering the luminance value of the current pixel may include averaging the luminance value of the current pixel with a luminance value of at least one adjacent pixel, and a strength of the filtering may be determined by weightings applied to the luminance values when averaging the luminance values. Comparing the chrominance values of the current and adjacent pixels may include calculating a difference between the chrominance values of the current and adjacent pixels. Moreover, the strength of filtering may be reduced when the difference between the chrominance values of the current and adjacent pixels is above a predetermined threshold, and the strength of filtering may be increased when the difference between the chrominance values of the current and adjacent pixels is below the predetermined threshold.

The data may be provided in a YCrCb format where Y is a luminance value and Cr and Cb are respective red and blue chrominance values for each pixel. Moreover, comparing the chrominance values of the current and adjacent pixels may include summing an absolute value of a difference of the Cr value for each pixel and an absolute value of a difference of the Cb value for each pixel. More particularly, the absolute value of the difference of the Cr value for each pixel may be a squared difference of the Cr values and the absolute value of the difference of the Cb value for each pixel may be a squared difference of the Cb value. In addition, decreasing the strength of filtering may comprise passing the luminance data for the pixel without filtering. In addition, the luminance values of the current pixel and at least one adjacent pixel may be compared before filtering the luminance value of the current pixel, and a strength of the filtering maybe based on the comparison of the chrominance values of the first and second pixels and on the comparison of the luminance values.

Receiving the chrominance values and luminance values for a current pixel and at least one adjacent pixel may include receiving the chrominance and luminance values from a digital camera, and the data including the filtered luminance value can be encoded and transmitted over a wireless interface. Encoding may include varying a rate of compression of the data, and a strength of the filtering may be based on the comparison of the chrominance values of the first and second pixels and on the rate of compression applied during encoding. Receiving chrominance values and luminance values from the digital camera may include receiving chrominance values and luminance values for a frame of data, and filtering the luminance value may include filtering luminance values for the frame of data. In addition, portions of the filtered frame to which texture should be applied can be identified, and an identification of portions of the frame to which texture should be applied can be transmitted. An identification of one of a plurality of textures which should be applied can also be transmitted.

The encoded data may be received over a wireless interface, and the encoded data may be decoded before receiving the chrominance values and luminance values for the current pixel and the at least one adjacent pixel to provide the chrominance values and luminance values for the current pixel and for the at least one adjacent pixel. Filtering the luminance value may include filtering luminance values for a frame of data, identifying a portion of the frame to which texture should be applied, and, after filtering the luminance values from the frame of data, the texture can be applied to the identified portions of the frame.

Moreover, the first and adjacent pixels may be one of horizontally adjacent, vertically adjacent, diagonally adjacent, and/or temporally adjacent. In addition, filtering the luminance value of the current pixel may include low-pass filtering the luminance value of the current pixel.

According to additional embodiments of the present invention, methods may be provided for processing digital image and/or video data from a transmitting device wherein a frame of the data comprises a plurality of rows and columns of pixels with data for each pixel including a luminance value and a chrominance value. In additions the data is pre-filtered and encoded before transmission, and the data may be pre-filtered according to a pre-filtering algorithm. The pre-filtered and encoded data may be received from the transmitting device, and the pre-filtered and encoded data from the transmitting device may be decoded. The decoded data may be post-filtered according to a post-filtering algorithm wherein the pre-filtering and post-filtering algorithms are matched.

According to still additional embodiments of the present invention, methods may be provided for processing digital image and/or video data from a transmitting device wherein a frame of the data includes a plurality of rows and columns of pixels with data for each pixel including a luminance value and a chrominance value. The data may be pre-filtered and encoded before transmission, and the data may be pre-filtered according to a pre-filtering algorithm with parameters of the pre-filtering algorithm being transmitted from the transmitting device. The pre-filtered and encoded data and the parameters of the pre-filtering algorithm may be received from the transmitting device. The pre-filtered and encoded data from the transmitting device may be decoded, and the decoded data may be post-filtered according to a post-filtering algorithm wherein the operation of the post-filtering algorithm is adapted according to the parameters of the pre-filtering algorithm received from the transmitting device.

According to yet additional embodiments of the present invention methods may be provided for processing digital image and/or video data wherein a frame of the data includes a plurality of rows and columns of pixels. A luminance value for a current pixel may be received, and the luminance value of the current pixel may be filtered. The data including the filtered luminance value may be encoded wherein encoding data comprises varying a rate of compression of the data, and wherein a strength of the filtering of the luminance value is varied responsive to the rate of compression applied during encoding.

According to more embodiments of the present invention, methods may be provided for processing digital image and/or video data wherein a frame of the data comprises a plurality of rows and columns of pixels. Data for pixels of a frame may be received and filtered, and a portion of the frame of data to which texture should be applied can be identified. The filtered data for the pixels of the frame can be encoded, and the encoded and filtered data for the pixels of the frame can be transmitted. In addition, identification of the portion of the frame of data to which texture should be applied can be transmitted.

According to still more embodiments of the present invention, methods may be provided for processing digital image and/or video data wherein a frame of the data comprises a plurality of rows and columns of pixels. Data for pixels of a frame of the data may be received and decoded. A portion of the frame of data to which texture should be applied can be identified, and after decoding the data for the pixels of the frame, the texture can be applied to the identified portion of the frame of data.

According to additional embodiments of the present invention, computer program products may be provided for processing digital image and/or video data wherein a frame of the data includes a plurality of rows and columns of pixels with data for each pixel including a luminance value and a chrominance value. The computer program-products may include a computer-readable storage medium having computer-readable program code embodied in the medium. The computer-readable program code may include computer-readable program code that receives chrominance values and luminance values for a current pixel and at least one adjacent pixel; that compares the chrominance values of the current pixel and the at least one adjacent pixel; and that filters the luminance value of the current pixel wherein a strength of filtering the luminance value is based on the comparison of the chrominance values of the current and at least one adjacent pixels.

According to still additional embodiments of the present invention, computer program products may be provided for processing digital image and/or video data from a transmitting device wherein a frame of the data includes a plurality of rows and columns of pixels with data for each pixel including a luminance value and a chrominance value, wherein the data is pre-filtered and encoded before transmission and wherein the data is pre-filtered according to a pre-filtering algorithm. The computer program products may include a computer-readable storage medium having computer-readable program code embodied in the medium. The computer-readable program code may include computer-readable program code that receives the pre-filtered and encoded data from the transmitting device; that decodes the pre-filtered and encoded data from the transmitting device; and that post-filters the decoded data according to a post-filtering algorithm wherein the pre-filtering and post-filtering algorithms are matched.

According to yet additional embodiments of the present invention, computer program products may be provided for processing digital image and/or video data from a transmitting device wherein a frame of the data comprises a plurality of rows and columns of pixels with data for each pixel including a luminance value and a chrominance value. Moreover, the data may be pre-filtered and encoded before transmission with the data being pre-filtered according to a pre-filtering algorithm and with parameters of the pre-filtering algorithm being transmitted from the transmitting device. The computer program products may include a computer-readable storage medium having computer-readable program code embodied in the medium. The computer program products may include computer-readable program code that receives the pre-filtered and encoded data from the transmitting device; that receives the parameters of the pre-filtering algorithm transmitted from the transmitting device; that decodes the pre-filtered and encoded data from the transmitting device; and that post-filters the decoded data according to a post-filtering algorithm wherein the operation of the post-filtering algorithm is adapted according to the parameters of the pre-filtering algorithm received from the transmitting device.

According to more embodiments of the present invention, computer program products may be provided for processing digital image and/or video data wherein a frame of the data comprises a plurality of rows and columns of pixels. The computer program products may include a computer-readable storage medium having computer-readable program code embodied in the medium. The computer-readable program code may include computer-readable program code that receives a luminance value for a current pixel; that filters the luminance value of the current pixel; and that encodes the data including the filtered luminance value wherein encoding data comprises varying a rate of compression of the data, and wherein a strength of the filtering of the luminance value is varied responsive to the rate of compression applied during encoding.

According to still more embodiments of the present invention, computer program products may be provided for processing digital image and/or video data wherein a frame of the data comprises a plurality of rows and columns of pixels. The computer program products may include a computer-readable storage medium having computer-readable program code embodied in the medium. The computer-readable program code may include computer-readable program code that receives data for pixels of a flame of the data; that filters the data for the pixels of the frame; that identifies a portion of the frame of data to which texture should be applied; that encodes the filtered data for the pixels of the frame; that transmits the encoded and filtered data for the pixels of the frame; and that transmits identification of the portion of the frame of data to which texture should be applied.

According to yet more embodiments of the present invention, computer program products may be provided for processing digital image and/or video data wherein a frame of the data comprises a plurality of rows and columns of pixels. The computer program product may include a computer-readable storage medium having computer-readable program code embodied in the medium. The computer-readable program code may comprise computer-readable program code that receives data for pixels of a frame of the data: that decodes the data for pixels of the frame; that identifies a portion of the frame of data to which texture should be applied; and that applies the texture to the identified portion of the frame of data after decoding the data for the pixels of the frame.

BRIEF DESCRIPTION OF THE DRAWINGS

FIGS. 3-9 are flow charts illustrating operations of processing image and/or video data according to embodiments of the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiments a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It should be emphasized that the term "comprise/comprises/comprising" when used in this specification is taken to specify the presence of stated features, integers, steps or components but does not preclude the presence or addition of one or more other features, integers, steps, components or groups thereof.

Figure 1:
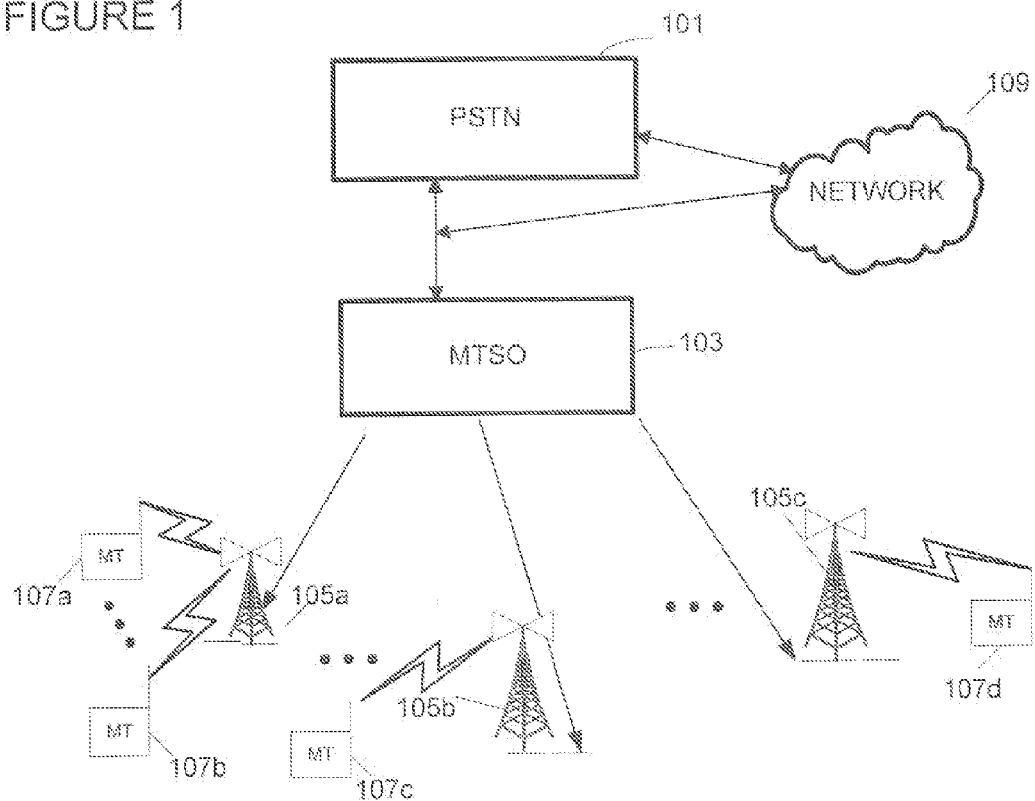
FIG. 1 is a diagram of communications systems according to embodiments of the present invention.

Now referring to FIG. 1, wireless communications may be provided according to embodiments of the present invention by a wireless communications system including a mobile telephone switching office (MTSO) 103 and a plurality of base stations 105a-c. Each base station, for example, may provide wireless communications with one or a plurality of mobile terminals (MT) 107a-d, and the mobile telephone switching office may also provide communications with a public switched telephone network (PSTN) 10 and/or a data communications network 109 such as an intranet and/or the Internet. The wireless communications system can thus provide voice, image and/or video, video, and/or data communications between two mobile terminals 107 between a mobile terminal 107 and a conventional telephone coupled to the public switched telephone network 101, and/or between a mobile terminal 107 and a computing device (such as a personal or laptop computer) coupled to the data communications network 109 and/or coupled to the public switched telephone network.

The wireless communications system, for example, may be a wireless communications network such as a WiFi network, a cellular network, a Personal Communications Services (PCS) network, a satellite communications network, an ultra-wideband network, and/or a Bluetooth network. Each mobile terminal 107, for example, may be a radiotelephone, a personal wirelessly enabled digital assistant (such as Palm Pilot™ or a Pocket PC™), a pager, a wireless messaging device (such as a Blackberry™ wireless handheld device), a wireless enabled laptop computer, and/or combinations thereof. Moreover, direct communications may be enabled between mobile terminals 107 without use of a base station 105 and/or mobile telephone switching office 103.

Mobile terminals 107 can thus be used to provide wireless voice and/or data communications and the wireless communications may be digital. Mobile terminals 107 may also include digital cameras therein and/or coupled thereto. A digital camera may capture a frame made up of a plurality of rows and columns of pixels to provide a digital image and/or video (picture), and/or the digital camera may capture a plurality of sequential frames to provide video. Such digital image and/or videos and/or video may be stored in memory of a mobile terminal and viewed on a screen of the mobile terminal. Digital image and/or video data may also (or in an alternative) be transmitted from the mobile terminal 107 over a wireless interface to another mobile terminal 107, and/or to another device coupled to a public switched telephone network 101 and/or the data communications network 109. Digital image and/or video data may also (or in an alternative) be transmitted from the mobile terminal 107 over a wired interface (such as using port 218) to another mobile terminal or device.

When transmitting image and/or video over a wireless interface, a bandwidth of the transmission may be reduced by filtering the image and/or video before transmission. Data representing the image and/or video, for example, may be subjected to low-pass filtering to reduce high frequency components of the image and/or video that may consume a relatively large amount of bandwidth while being relatively difficult to perceive and/or providing relatively little visual information. Moreover, a strength of filtering of the data can be varied on a pixel by pixel basis so that visually important information such as edges between objects can be preserved while high frequency components that may be more difficult to perceive or may not be as visually important are filtered more strongly. According to embodiments of the present invention, high frequency information in textures with little variation in chrominance values across pixels including the high frequency information in textures may be removed with little significant impact to the subjective quality of the image and/or video.

More particularly, each pixel of a frame of digital image and/or video data may have a luminance value and a plurality of chrominance values associated therewith, and the luminance value of a current pixel may be filtered with a strength of filtering of the luminance value being based on a comparison of chrominance values of the current and at least one adjacent pixel. The filtered image and/or video data can then be encoded before transmission to another device and/or storage in memory to further reduce a bandwidth consumed in transmission and/or to further reduce memory consumed in storage. In addition or in an alternative, filtering according to embodiments of the present invention may be performed at a device receiving digital image and/or video data prior to reproducing and/or storing the image and/or video.

Figure 2:
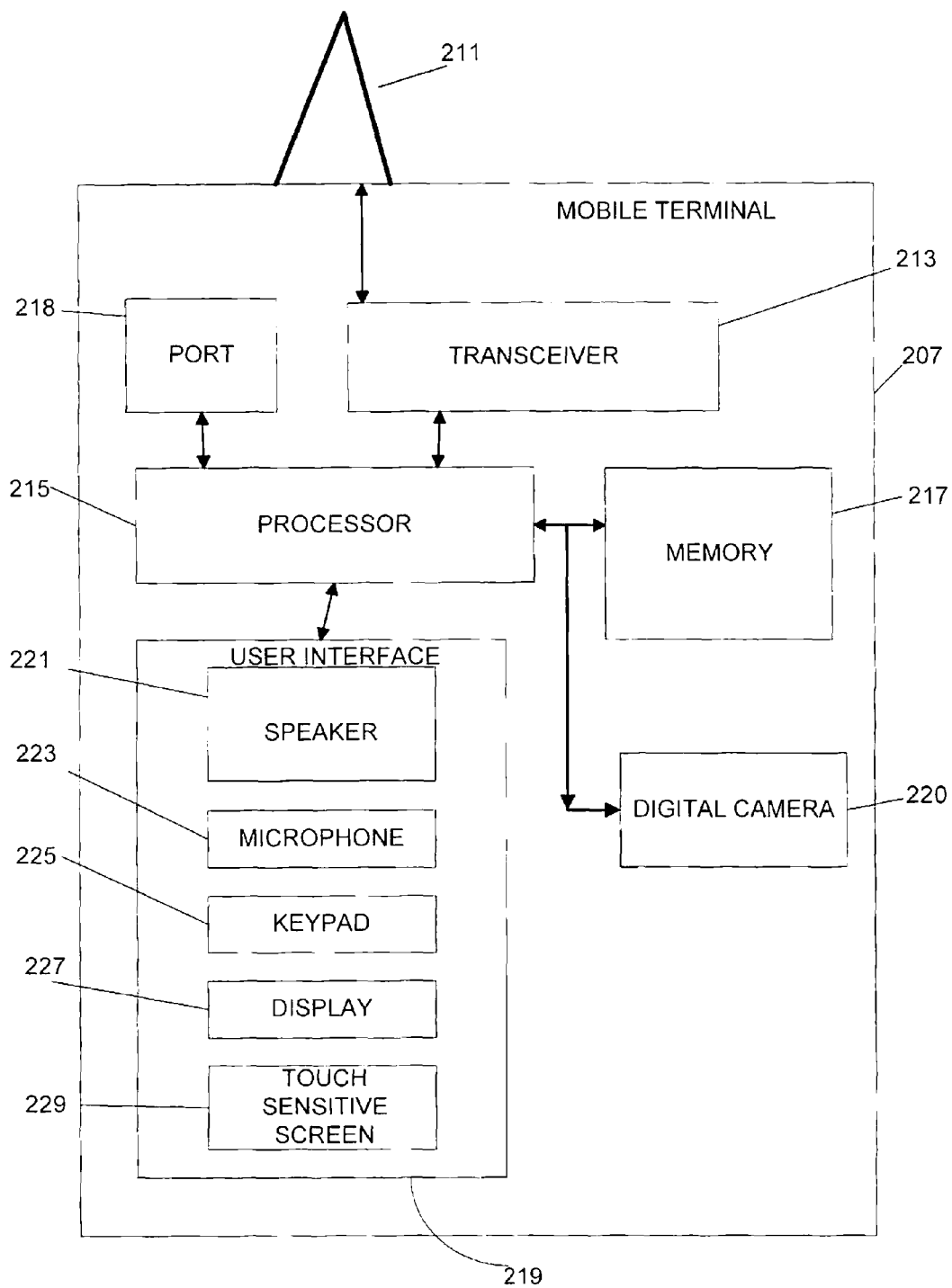
FIG. 2 is a block diagram of a mobile terminal according to embodiments of the present invention.

As shown in FIG. 2, a mobile terminal 207 according to embodiments of the present invention may include an antenna 211, a transceiver 213, a processor 215, a memory 217, a port 218, a user interface 219, and/or a digital camera 220. More particularly, the user interface 219 may include one or more of a speaker 221, a microphone 223, a keypad 225, a display 227 (such as a flat panel screen or liquid crystal display), and/or a touch sensitive screen 229. The mobile terminal 207 may be a radiotelephone, a personal wirelessly enabled digital assistant (such as Palm Pilot™ or a Pocket PC™), a pager, a wireless messaging device (such as a Blackberry™ wireless handheld device), a wireless enabled laptop computer, and/or combinations thereof. Moreover, the mobile terminal may provide wireless communications through one or more communications networks such as a WiFi network, a cellular network, a Personal Communications Services (PCS) network, a satellite communications network, an ultra wideband network, and/or a Bluetooth network, as discussed above with regard to FIG. 1.

In addition, the mobile terminal 207 may provide communications directly with another device without use of an intermediary communications system or network. For example, the mobile terminal 207 may provide direct wireless communications with another mobile terminal using a radio frequency, an infrared, and/or an optical coupling. In an alternative, the mobile terminal 207 may provide direct communications with another mobile terminal using a wired and/or fiber optic coupling through port 218. The mobile terminal may also be a digital still camera and/or digital video camera without providing other communications and/or computing functionalities.

According to embodiments of the present invention, the digital camera 220 may capture a single frame as a still image and/or video to provide a picture and/or a plurality of consecutive frames to provide video. More particularly, an image and/or video may be defined as a frame including a plurality of rows and columns of pixels, and data for each pixel may include a luminance value and a plurality of chrominance values. According to YCbCr formats, for example, each pixel is defined by a luminance value Y, a chrominance blue value Cb, and a chrominance red value Cr. Moreover, according to some formats, the chrominance values may be sub-sampled to reduce data processing, memory, and/or transmission bandwidth requirements. According to the YCbCr 4:2:2 format, for example, a sampled Y (luminance value) is maintained for each pixel, but only one Cb (chrominance blue value) and only one Cr (chrominance red value) is maintained for each pair of pixels. According to the YCbCr 4:2:0 format, a sampled Y (luminance value) is maintained for each pixel, but only one Cb and only one Cr is maintained for each block of four pixels.

The pixel data captured by the digital camera 220 may be provided to either or both of the processor 215 and/or the memory 217 or the pixel data may initially be stored in a memory included with in the digital camera 220. For example, the original pixel data from the digital camera may be stored in memory 217 before processing at processor 215. In an alternative, the pixel data may be processed at processor 215 before storing processed pixel data in memory 217. In another alternative, the pixel data may be processed in processor 215 and transmitted through transceiver 213 and antenna 211 without storing either original or processed pixel data in memory 217.

The processor 215 of FIG. 2 may thus filter image and/or video data received from digital camera 220, memory 217, transceiver 213 and/or port 218. For example, the processor may receive the data from the digital camera 220 and/or memory 217 before encoding the data for transmission from transceiver 213 and antenna 211 over a wireless interface. In an alternative, the processor 215 may receive the data from transceiver 213 after reception over a wireless interface, and the processor may decode the data before filtering.

More particularly, the processor 215 may process the digital image and/or video data so that a luminance value of a pixel of a frame can be filtered based on a comparison of chrominance values of the current pixel and a pixel adjacent to the pixel currently being processed. More particularly, the chrominance values and luminance values for a current and at least one adjacent pixel can be received from memory 217, digital camera 220, transceiver 213, and/or port 218. The chrominance values for the current and at least one adjacent pixel can be compared, and the luminance value for the current pixel can be filtered with a strength of filtering of the luminance value being based on the comparison of the chrominance values of the current pixel and at least one adjacent pixel. Accordingly, a strength of filtering for luminance values in a frame can vary pixel by pixel based on comparisons of chrominance values for each pixel and an adjacent pixel.

As used herein, the term current pixel refers to the pixel currently being processed, and the term adjacent pixel refers to a pixel adjacent to the pixel currently being processed. An adjacent pixel may be horizontally, vertically, or diagonally adjacent to the current pixel, and the adjacent pixel may be directly or immediately adjacent to the current pixel with no intervening pixels there between. In an alternative, intervening pixels may be present between the current and adjacent pixel. Moreover, the adjacent pixel may be temporally adjacent to the current pixel in a series of video frames such that the adjacent pixel occupies a corresponding pixel location in a frame previous or subsequent to the frame of the current pixel.

In addition, the adjacent pixel may be selected such that the current and adjacent pixels do not share a same chrominance value or values. If chrominance values are sub-sampled so that blocks of four pixels share the same Cb and Cr values according to the YCbCr 4:2:0 format, for example, the adjacent pixel can be selected from an adjacent block of pixels different than the block of pixels including the current pixel. Similarly if chrominance values are sub-sampled so that pairs of two pixels share the same Cb and Cr values according the YCbCr 4:2:2 format, the adjacent pixel can be selected from an adjacent pair of pixels different than the pair of pixels including the current pixel.

More particularly, the processor 215 may filter the luminance value of the current pixel by averaging the luminance value of the current pixel with a luminance value of one or more adjacent pixels, and the strength of filtering may be determined by weightings applied to the luminance values when averaging. According to a particular embodiment, the luminance value of the current pixel may be averaged with luminance values of the two horizontally, vertically, and/or diagonally adjacent pixels on either side thereof. With relatively strong filtering, approximately equal weightings (i.e. approximately 33.33%) can be applied to each of the three luminance values being averaged to provide the filtered luminance value for the current pixel. With relatively weak filtering, relatively low weightings (i.e. approximately 10%) can be applied to the luminance values of the two adjacent pixels and a relatively high weighting (i.e. approximately 80%) can be applied to the luminance value of the current pixel when averaging the luminance values of the three pixels to provide the filtered luminance value for the current pixel. By applying weightings of 0% to the luminance value of the two adjacent pixels and applying a weighting of 100% to the luminance value of the current pixel, the original luminance value of the current pixel can be passed through without filtering. If no filtering is desired for a luminance value of a particular pixel, the original luminance value of the pixel can be passed through filtering without change or averaging to provide zero filtering. Filtering is discussed above by way of example only, and more advanced implementations could consider more surrounding pixels, for example.

The processor 215 may compare chrominance values for current and adjacent pixels by calculating a difference between the chrominance values of the current and adjacent pixels. The strength of filtering applied by the processor may be reduced when the difference between the chrominance values of the pixels being compared is above a predetermined threshold, and the strength of filtering applied by the processor 215 may be increased when the difference between the chrominance values of the current and adjacent pixels is below the predetermined threshold. For example, predetermined weightings greater than zero may be applied to luminance values of adjacent pixels when averaging if the difference between chrominance values is less than the predetermined threshold, and weightings of zero can be applied to luminance values of adjacent pixels when averaging if the difference between chrominance values is greater than the predetermined threshold. In addition, the non-zero weightings applied when the difference between the chrominance values is less than the predetermined threshold can be varied based on other factors such as a comparison of luminance values, a degree of compression applied during encoding, and/or to match filtering characteristics of a transmitting or receiving device. In an alternative, the strength of filtering may be varied between pixels on a scale of degree with the strength of filtering of the luminance value of the current pixel being inversely proportional to the difference in chrominance values of the current and adjacent pixels.

According to particular embodiments of the present invention, the digital data for each pixel of a frame may be provided in a YCbCr format where Y is a luminance value and Cr and Cb are respective red and blue chrominance values. The chrominance values for the current and adjacent pixel can be compared by the processor 215 by summing an absolute value of a difference of the Cr value for each pixel and an absolute value of a difference of the Cb value for each pixel. Moreover, the absolute value of the difference of the Cr value for each pixel may be a squared difference of the Cr values, and the absolute value of the difference of the Cb value for each pixel may be a squared difference of the Cb values. Accordingly, the chrominance values may be compared by the processor by calculating a difference D according to the following formula:

$$D=(Cb_i-Cb_j)^2+(Cr_i-Cr_j)^2 \qquad \text{Equation 1}$$

In this formula, $Cr_i$, and $Cr_j$, are the red chrominance values for the respective current (i) and adjacent (j) pixels, and $Cb_i$, and $Cb_j$, are the blue chrominance values for the respective current (i) and adjacent (j) pixels.

As discussed above, the strength of filtering applied by the processor 215 to the luminance value of the current pixel may vary inversely with respect to the value D calculated when comparing chrominance values according to the formula of Equation 1. If the value D (difference of chrominance values for the current and adjacent pixels) exceeds a predetermined threshold K, the luminance value for the current pixel may be passed through without change so that effectively no filtering is applied. As discussed above, no filtering can be obtained, for example, by merely passing the original luminance value for the current pixel through, or by averaging the current pixel with other pixels but applying zero (0%) weightings to the adjacent pixels. Empirical tests have shown that values of K=25 may provide a suitable threshold to determine when to omit low-pass filtering for the luminance value of the current pixel according to embodiments of the present invention.

Before filtering the luminance value of the current pixel, luminance values of the current pixel and at least one adjacent pixel may also be compared, and a strength of filtering applied by processor 125 may be based on the comparison of chrominance values and on a comparison of the luminance values. According to some embodiments of the present invention, if the difference between chrominance values (for example, the value D of equation 1) exceeds a predetermined threshold (for example, K) for a current pixel, the current pixel may be passed without filtering. If the difference between chrominance values is less than the predetermined threshold, a determination can be made if the current pixel has a significant color component. For example, if either of the chrominance values Cb, or Cr, exceeds a predetermined threshold, such as M, the current pixel may be assumed to have "a significant color component and low-pass filtering may proceed.

If neither of the chrominance values Cb, or Cr, exceeds the predetermined threshold, such as M, the pixel may be a gray scale (black or white) pixel and the processor 215 may further determine if there is a significant change in luminance values between the current pixel and an adjacent pixel before filtering. If there is no significant change in luminance values, the luminance value of the current pixel may be low-pass filtered. If there is a significant change in luminance values, the luminance value for the current pixel may be passed through filtering without change. Accordingly, edges between black and white areas of an image and/or video may be more accurately preserved by disabling filtering when both of the chrominance values of the current pixel are sufficiently low but there is a large change in adjacent luminance values.

Figure 10:
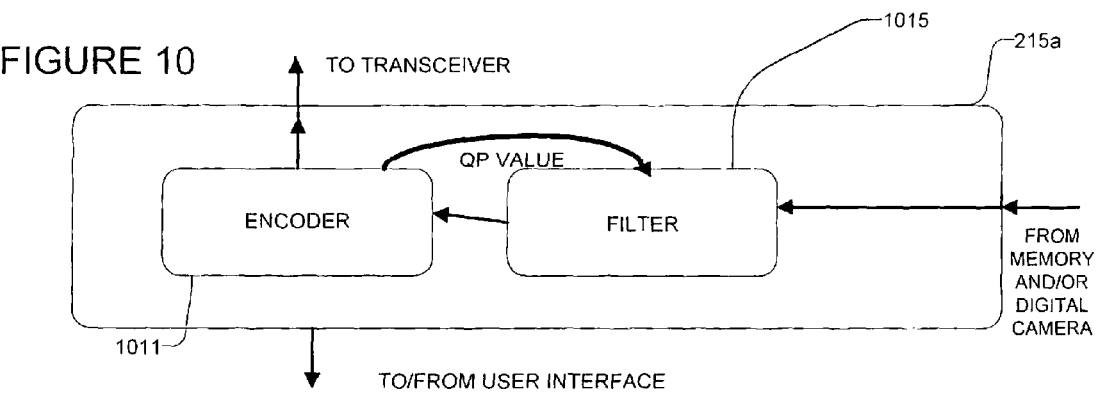
FIGS. 10-12 are block diagrams illustrating processors according to embodiments of the present invention.

As illustrated in FIG. 10, a processor 215a may be configured to include an encoder 1011 and a filter 1015 according to embodiments of the present invention. Receiving chrominance and luminance values at the processor 215a may include receiving chrominance and luminance values from a digital camera either directly or via memory used to store the values. Moreover, digital image and/or video data can be filtered by filter 1015 and encoded by encoder 1011 and transmitted by a transceiver over a wireless interface. By filtering the luminance values using filter 10 1015 as discussed above, high frequency information that is not easily perceived can be filtered so that the encoded image and/or video data may consume less bandwidth when transmitted over the wireless interface.

In addition, the encoder 1011 used to encode the digital image and/or video data may vary a rate of compression applied to the digital image and/or video data, and a strength of the filtering at filter 1015 can be based on the comparison of the chrominance values and on the rate of compression applied by encoder 1011. A rate of compression, for example, may be varied to maintain a relatively constant bit rate for image and/or videos being transmitted over a wireless interface. For example, an amount of loss during encoding can be determined using a quantization parameter CQP) with a low QP value providing relatively low compression and relatively high quality and with a high QP value providing relatively high compression and relatively low quality. With a relatively high QP value and high compression, a number of compression artifacts in the resulting image and/or video may increase.

When transmitting encoded video image and/or video data for example, a rate control mechanism of the encoder 1011 may change the QP value to provide a relatively constant bit rate. When filtering the luminance values as discussed above prior to encoding, the strength of filter 1015 may be varied responsive to the QP value. In particular, the strength of filter 1015 may be increased when the QP value is relatively high, and the strength of the filter may be reduced when the QP value is 30 relatively low. A strength of filter 1015 can thus be modified responsive to a level of compression being applied by encoder 1011, and distortions may thus be reduced. Other encoding information such as motion vectors and/or macro-block skip information could also be used to modify operation of filter 1015.

According to some embodiments of the present invention, a comparison of chrominance values may be used to determine a threshold for filtering at filter 1015. For example, if a difference of chrominance values as determined using Equation 1 exceeds a threshold K, the luminance value for the current pixel may be passed without change by filter 1015 (i.e. weak or no filtering). If the difference in chrominance values is less than the threshold K, the luminance value for the current pixel may be filtered by averaging with adjacent pixels. The weightings applied when averaging the luminance values may be varied as a function of the QP value as discussed above.

Moreover, the QP value from the encoder 1011 may be used to vary a filtering strength of filter 1015, and the QP value may be provided to the filter 1015 after completion of encoding a previous block of image and/or video data. Pixels may be encoded in groups of pixels such as blocks, macro-blocks, and/or macro-block lines, for example, and the QP value determined when encoding a previous group of pixels may be used to set a filtering strength of filter 1015 for a current group of pixels including the current pixel. In an alternative, multi-pass filtering and encoding may be employed so that a QP valued used to encode the current pixel may be used to determine a filtering strength for the current pixel before final encoding and/or transmission.

Figure 11:
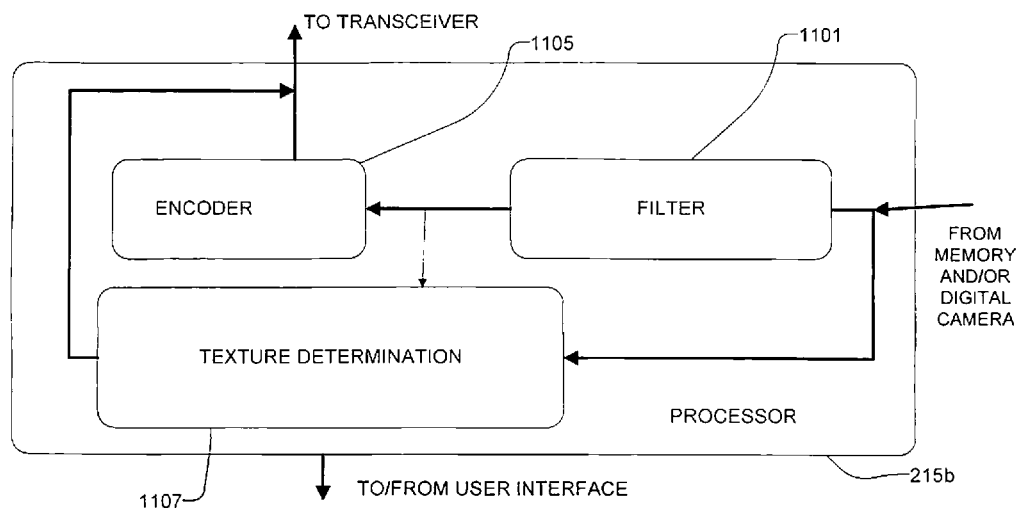

As illustrated in FIG. 11, a processor 215b according to embodiments of the present invention may include a filter 1101, an encoder 1105, and a texture determination block 1107. As discussed above, filtering operations can be performed by the filter 1101 for the pixels of an image and/or video frame, and the filtered pixel data for the frame or portions thereof can be encoded by encoder 1105 and transmitted from a transceiver over a wireless interface to another device.

More particularly, receiving chrominance and luminance values at the processor 215b may include receiving chrominance and luminance values for a frame of image and/or video data. Moreover, comparisons of chrominance values and filtering of luminance values at filter 1101 may be performed for each pixel. In addition, portions of the filtered frame to which texture should be applied can be determined by the texture determination block 11107, and an identification of portions of the frame to which texture should be applied can be transmitted by the transceiver. Moreover, an identification of one of a plurality of textures which should be applied can be transmitted to the receiving device.

When filtering as discussed above, a textured surface (i.e. a surface with, relatively uniform chrominance across pixels included in the surface but variation in luminance across pixels included in the surface) in an image and/or video may be converted to a visually smooth surface as a result of filtering. Details of the surface texture may not be important for perception of an object including the surface, but filtering may provide an unnatural look. A more natural look may thus be provided by replacing the original texture that has been filtered out with an artificial texture (such as "comfort noise") wherein a bandwidth used to transmit a characterization of the artificial texture can be less than a bandwidth used to transmit the actual texture information.

Portions of the filtered frame to which texture should be applied can be determined by the texture determination block 1107 by comparing the filtered pixel data for the frame from the filter 110 with the unfiltered pixel data for the frame directly from the digital camera and/or frame. For each region of the frame where a texture has been removed, the removed texture can be classified and parameterized by the texture determination block 1107, and the texture parameters and/or classifications can then be transmitted along with the bit-stream used to transmit the filtered and encoded pixel data for the frame. A device receiving the image and/or video frame can thus receive the texture parameters and/or classifications for the frame and can use the texture parameters and/or classifications to artificially add high frequency information (i.e. artificial texture and/or "comfort noise") to a surface from which actual texture has been filtered.

Because chrominance values may be relatively invariant on surfaces that have been low-pass filtered according to embodiments of the present invention discussed above, areas of a frame having relatively invariant chrominance values may be selected for application of artificial texture and/or "comfort noise." Stated in other words, the receiving device may use chrominance values to determine what areas or a frame have had texture information filtered there from, and what texture and/or "comfort noise" to apply in these areas. When receiving a plurality of frames of video, the receiving device may also be adapted to provide that artificial texture and/or "comfort noise" is applied stably to surfaces that may move from frame to frame of a video sequence. As a surface including artificial texture and/or "comfort noise" moves from frame to frame, the artificial texture and/or "comfort noise" should move along with the surface.

Figure 12:
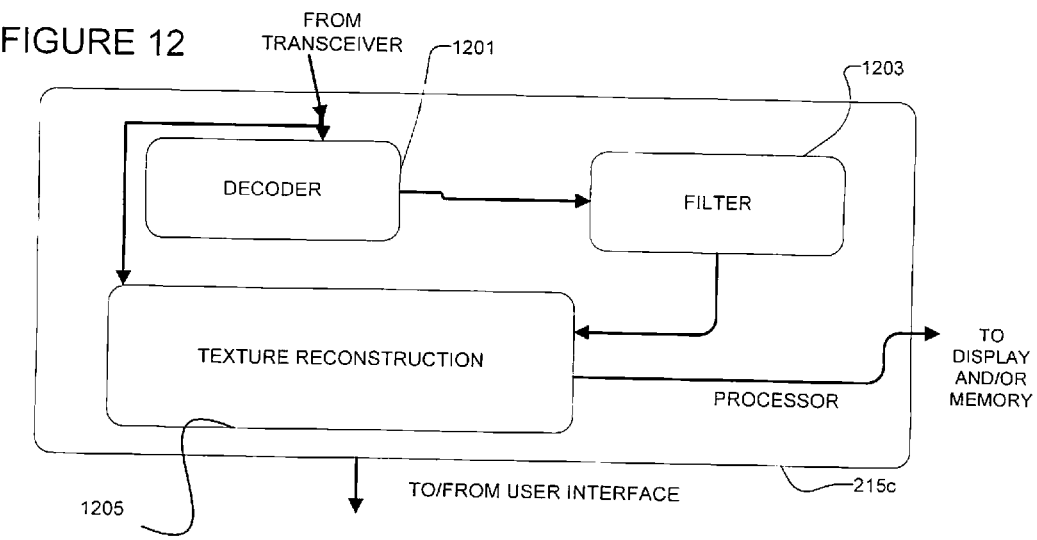

As illustrated in FIG. 12, a processor 215e according to additional embodiments of the present invention may include a decoder 1201, a post-filter 1203 and a texture reconstruction block 1205. The processor 215e may thus facilitate receiving image and/or video data from a transmitting device which transmits texture information as discussed above, for example with respect to FIG. 11. The post filter 1203, for example, may operate as discussed above with respect to pre-filters 1015 and 1101 of FIGS. 10 and 11. More particularly, the post-filter 1203 may provide post-filtering after decoding at decoder 1201 in a device receiving encoded image and/or video data over a wireless interface. More particularly, encoded digital image and/or-video data may be received over a wireless interface. Moreover, the encoded digital image and/or video data can be decoded by decoder 1201 to provide chrominance values and luminance values for the current pixel and for the at least one adjacent pixel received.

If classifications and/or parameters for artificial texture information such as "comfort noise" have been transmitted with the image and/or video data, portions of the frame to which artificial texture should be applied can be determined by texture reconstruction block 1205, and the artificial texture can be applied after the post-filter 1203 has filtered luminance values from the frame of image and/or video data.

Accordingly, image and/or video data can be pre-filtered by a pre-filter before encoding and transmission from a transmitting device, and/or the image and/or video data can also be post-filtered after reception and, decoding at a receiving device. By performing both pre-filtering and post-filtering, a number of high frequency artifacts and distortions due to encoding and/or decoding may be reduced. According to some embodiments of the present invention using both pre-filtering and post-filtering, information about the pre-filter type and/or parameters may be transmitted from the transmitting device to the receiving device. The receiving device can then adapt operation of the post-filter to match that of the corresponding pre-tilter. The pre-filter type and/or parameters may be transmitted as either user data in the image and/or video bit stream or stored in an encapsulated file format. In addition or in an alternative, image and/or video codec standards may include pre-filter types and/or parameters as a part of the bit stream. Transmission of filter types and/or parameters may not be required if pre-filters and post-filters are provided according to a common standard.

Moreover, exact matching of pre-filter and post-filter types and/or parameters may not be required according to embodiments of the present invention. By using information about the pre-filter parameters and selecting a slightly different filter for the post-filter, sufficient and/or better results may be provided.

The processors of FIGS. 10-12 are provided to illustrate embodiments of the present invention without limiting operations of processors to the particular functionalities illustrated and discussed. By way of example, the processors of FIGS. 10-12 do not illustrate known operations of supporting wireless communications such as cellular radiotelephone communications. Moreover, 10 functionalities of processors of FIGS. 10-12 may be mixed according to embodiments of the present invention, and/or not all functionalities illustrated in FIGS. 10-12 are required for operations-according to embodiments of the present invention. For example, the processor 215 of mobile terminal 207 may include functionalities of both processors 215b and 215e to support transmission of image and/or video data with texture information to another device and to support receipt of image and/or video data with texture information from another device. In an alternative, the processor 215 of mobile terminal 207 may include functionality of processor 215a with or without QP value feedback. In another alternative, the processor 215 of mobile terminal 207 may include functionality of the processor 215b without texture determination block 125b, and/or the processor 215 may include functionality of processor 215e without texture reconstruction block 1205. In still another alternative, the processor 215 may be implemented with the functionality of processor 215b with the addition of QP value feedback as shown in FIG. 10.

Figure 3:
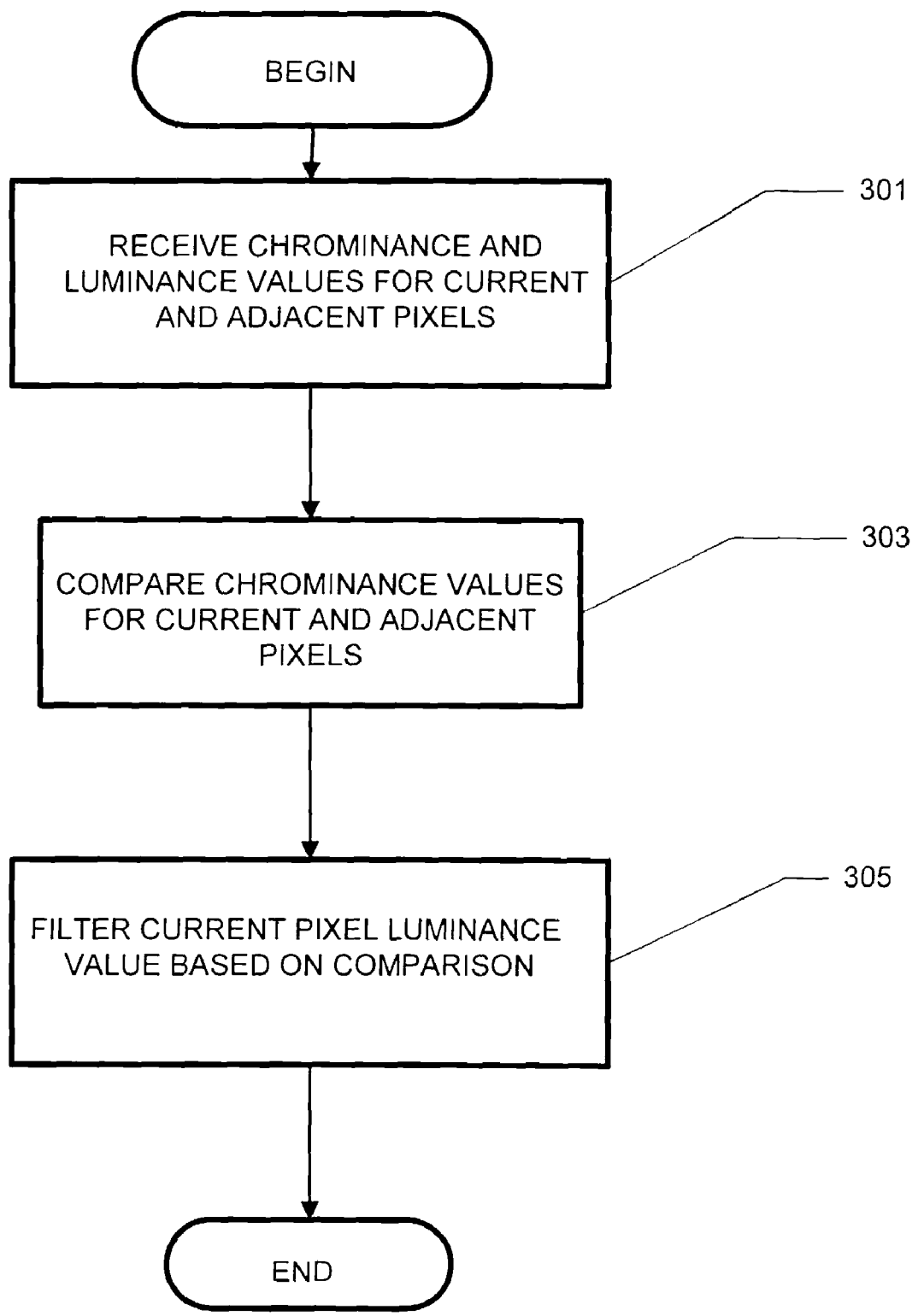

According to embodiments of the present invention illustrated in FIG. 3, digital image and/or video data can be processed so that a luminance value of a pixel of an image and/or video frame can be filtered based on a comparison of chrominance values of the current pixel and a pixel adjacent to the pixel currently being processed. More particularly, the chrominance values and luminance values for a current and at least one adjacent pixel can be received at block 301. The chrominance values for the current and at least one adjacent pixel can be compared at block 303, and at block 305; the luminance value for the current pixel can be filtered with a strength of filtering of the luminance value being based on the comparison of the chrominance values of the current and at least one adjacent pixel. Accordingly, a strength of filtering for luminance values in a frame can vary pixel by pixel based on comparisons of chrominance values for each pixel and an adjacent pixel.

As used herein, the term current pixel refers to the pixel currently being processed, and the term adjacent pixel refers to a pixel adjacent to the pixel currently being processed. An adjacent pixel may be horizontally, vertically, or diagonally adjacent to the current pixel, and the adjacent pixel may be directly adjacent to the current pixel with no intervening pixels there between. In an alternative, intervening pixels may be present between the current and adjacent pixel. Moreover, the adjacent pixel may be temporally adjacent to the current pixel in a series of video frames such that the adjacent pixel occupies a corresponding pixel location in a frame previous or subsequent to the frame of the current pixel.

In addition, the adjacent pixel may be selected such that the current and adjacent pixels do not share a same chrominance value or values. If chrominance values are sub-sampled so that blocks of four pixels share the same Cb and Cr values 15 according to the YCbCr 4:2:0 format, for example, the adjacent pixel can be selected from an adjacent block of pixels different than the block of pixels including the current pixel. Similarly, if chrominance values are sub-sampled so that pairs of two pixels share the same Cb and Cr values according the YCbCr 4:2:2 format, the adjacent pixel can be selected from an adjacent pair of pixels different than the pair of pixels including the current pixel.

More particularly, filtering the luminance value of the current pixel at block 305 may include averaging the luminance value of the current pixel with a luminance value of one or more adjacent pixels, and the strength of filtering may be determined by weightings applied to the luminance values when averaging. According to a particular embodiment, the luminance value of the current pixel may be averaged with luminance values of the two horizontally, vertically, and/or diagonally adjacent pixels on either side thereof. With relatively strong filtering, approximately equal weightings (i.e. approximately 33.33%) can be applied to each of the three luminance values being averaged to provide the filtered luminance value for the current pixel. With relatively weak filtering, relatively low weightings (i.e. approximately 10%) can be applied to the luminance values of the two adjacent pixels and a relatively high weighting (i.e. approximately 80%) can be applied to the luminance value of the current pixel when averaging the luminance values of the three pixels to provide the filtered luminance value for the current pixel. By applying weightings of 0% to the luminance value of the two adjacent pixels and applying a weighting of 100% to the luminance value of the current pixel, the original luminance value of the current pixel can be passed through without filtering. If no filtering is desired for a luminance value of a particular pixel, the original luminance value of the pixel can be passed through filtering without change or averaging to provide zero filtering.

Comparing chrominance values for current and adjacent pixels at block 303 may include calculating a difference between the chrominance values of the current and adjacent pixels. The strength of filtering applied at block 305 may be reduced when the difference between the chrominance values of the pixels being compared is above a predetermined threshold, and the strength of filtering applied at block 305 may be increased when the difference between the chrominance values of the current and adjacent pixels is below the predetermined threshold. For example, predetermined weightings greater than zero may be applied to luminance values of adjacent pixels when averaging if the difference between chrominance values is less than the predetermined threshold, and weightings of zero can be applied to luminance values of adjacent pixels when averaging if the difference between chrominance values is greater than the predetermined threshold. In addition, the non-zero weightings applied when the difference between the chrominance values is less than the predetermined threshold can be varied based on other factors such as a comparison of luminance values, a degree of compression applied during encoding, and/or to match filtering characteristics of a transmitting or receiving device. In an alternative, the strength of filtering may be varied between pixels on a scale of degree with the strength of filtering of the luminance value of the current pixel being inversely proportional to the difference in chrominance values of the current and adjacent pixels.

According to particular embodiments of the present invention, the digital data for each pixel of a frame may be provided in a YCbCr format where Y is a luminance value and Cr and Cb are respective red and blue chrominance values. The chrominance values for the current and adjacent pixel can be compared at block 303 by summing an absolute value of a difference of the Cr value for each pixel and an absolute value of a difference of the Cb value for each pixel. Moreover, the absolute value of the difference of the Cr value for each pixel may be a squared difference of the Cr values, and the absolute value of the difference of the Cb value for each pixel may be a squared difference of the Cb values. Accordingly, the chrominance values may be compared at block 303 by calculating a difference D according to the following formula:

$$D=(Cb_i-Cb_j)^2+(Cr_i-Cr_j)^2 \quad \text{Equation 1}$$

In this formula, $Cr_i$ and $Cr_j$ are the red chrominance values for the respective current (i) and adjacent (j) pixels, and $Cb_i$ and $Cb_j$ are the blue chrominance values for the respective current (i) and adjacent (j) pixels.

As discussed above, the strength of filtering applied to the luminance value of the current pixel at block 305 may vary inversely with respect to the value D calculated when comparing chrominance values at block 303 according to the formula of Equation 1. If the value D (difference of chrominance values for the current and adjacent pixels) exceeds a predetermined threshold K, the luminance value for the current pixel may be passed through block 305 without change so that effectively no filtering is applied. As discussed above, no filtering can be obtained, for example, by merely passing the original luminance value for the current pixel through, or by averaging the current pixel with other pixels but applying zero (0%) weightings to the adjacent pixels. Empirical tests have shown that values of K=25 may provide a suitable threshold to determine when to omit low-pass filtering for the luminance value of the current pixel according to embodiments of the present invention.

Before filtering the luminance value of the current pixel at block 305, luminance values of the current pixel and at least one adjacent pixel may also be compared, and a strength of filtering at block 305 may be based on the comparison of chrominance values and on a comparison of the luminance values. According to some embodiments of the present invention, if the difference between chrominance values (for example, the value D of equation 1) exceeds a predetermined threshold (for example, K) for a current pixel, the current pixel may be passed without filtering at block 305. If the difference between chrominance values is less than the predetermined threshold, a determination can be made if the current pixel has a significant color component. For example, if either of the chrominance values Cb, or Cr, exceeds a predetermined threshold, such as M, the current pixel may be assumed to have a significant color component, and low-pass filtering may proceed at block 305.

If the neither of the chrominance values Cb, or Cr, exceeds the predetermined threshold, such as M, the pixel may be a gray scale (black or white) pixel and a further determination may be made if there is a significant change in luminance values between the current pixel and an adjacent pixel before filtering at block 305. If there is no significant change in luminance values, the luminance value of the current pixel may be low-pass filtered at block 305. If there is a significant change in luminance values, the luminance value for the current pixel may be passed through filtering at block 305 without change. Accordingly, edges between black and white areas of an image and/or video may be more accurately preserved by disabling filtering when both of the chrominance values of the current pixel are sufficiently low but there is a large change in adjacent luminance values.

Receiving chrominance and luminance values at block 301 may include receiving chrominance and luminance values from a digital camera either directly or via memory used to store the values. Moreover, digital image and/or video data including the filtered luminance value for the current pixel can be encoded and transmitted over a wireless interface. By filtering the luminance values as discussed above, high frequency information that is not easily perceived can be filtered so that the encoded image and/or video data may consume less bandwidth when transmitted over the wireless interface.

In addition, encoding the digital image and/or video data may include varying a rate of compression applied to the digital image and/or video data, and a strength of the filtering at block 305 can be based on the comparison of the chrominance values at block 303 and on the rate of compression applied during encoding. A rate of compression, for examples may be varied to maintain a relatively constant bit rate for image and/or videos being transmitted over a wireless interface. For example, an amount of loss during encoding can be determined using a quantization parameter (QP) with a low QP value providing relatively low compression and relatively high quality and with a high QP value providing relatively high compression and relatively low quality. With a relatively high QP value and high compression, a number of compression artifacts in the resulting image and/or video may increase.

When transmitting encoded video image and/or video data, for example, a rate control mechanism may change the QP value to provide a relatively constant bit rate. When filtering the luminance values as discussed above with regard to FIG. 3 prior to encoding, the strength of filtering at block 305 may be varied responsive to the QP value. In particular, the strength of filtering may be increased when the QP value is relatively high, and the strength of filtering may be reduced when the QP value is relatively low. Filtering strength can thus be modified responsive to a level of compression being applied during encoding, and distortions may thus be reduced. Other encoding information such as motion vectors and/or macro-block skip information could also be used to modify filtering.

According to some embodiments of the present invention, a comparison of chrominance values at block 303 may be used to determine a threshold for filtering. For example, if a difference of chrominance values as determined using Equation 1 exceeds a threshold K, the luminance value for the current pixel may be passed without change at block 305 (i.e. weak or no filtering). If the difference in chrominance values is less than the threshold K, the luminance value for the current pixel may be filtered at block 305 by averaging with adjacent pixels. The weightings applied when averaging the luminance values may be varied as a function of the QP value as discussed above.

Moreover, the QP value used to vary filtering strength may be provided after completion of a previous block of image and/or video data. Pixels may be encoded in groups of pixels such as blocks, macro-blocks, and/or macro-block lines, for example, and the QP value determined when encoding a previous group of pixels may be used to set a filtering strength for a current group of pixels including the current pixel. In an alternative, multi-pass filtering and encoding may be employed so that a QP value used to encode the current pixel may be used to determine a filtering strength for the current pixel before final encoding and/or transmission.

As discussed above, operations of FIG. 3 can be performed for the pixels of an image and/or video frame, and the filtered pixel data for the frame or portions thereof can be encoded and transmitted to another device. More particularly, receiving chrominance and luminance values at block 301 may include receiving chrominance and luminance values for a frame of image and/or video data. Moreover, comparisons of chrominance values at block 303 and filtering of luminance values at block 305 may be performed for each pixel. In addition, portions of the filtered frame to which texture should be applied can be determined, and an identification of portions of the frame to which texture should be applied can be transmitted. Moreover, an identification of one of a plurality of textures which should be applied can be transmitted to a receiving device.

When filtering pixels as discussed above with regard to FIG. 3, a textured surface (i.e. a surface with relatively uniform chrominance across pixels included in the surface but variation in luminance across pixels included in the surface) in an image and/or video may be converted to a visually smooth surface as a result of filtering. Details of the surface texture may not be important for perception of an object including the surface, but filtering may provide an unnatural look. A more natural look may thus be provided by replacing the original texture that has been filtered out with an artificial texture (such as "comfort noise") wherein a bandwidth used to transmit a characterization of the artificial texture can be less than a bandwidth used to transmit the actual texture information.

Portions of the filtered frame to which texture should be applied can be determined by comparing the filtered pixel data for the frame with the unfiltered pixel data for the frame. For each region of the frame where a texture has been removed, the removed texture can be classified and parameterized, and the texture parameters and/or classifications can then be transmitted along with the bit stream used to transmit the filtered and encoded pixel data for the frame. The device receiving the image and/or video frame can thus receive the texture parameters and/or classifications for the frame and can use the texture parameters and/or classifications to artificially add high frequency information (i.e. artificial texture and/or "comfort noise") to a surface from which actual texture has been filtered.

Because chrominance values may be relatively invariant on surfaces that have been low-passed filtered according to embodiments of the present invention discussed above with regard to FIG. 3, areas of a frame having relatively invariant chrominance values maybe selected for application of artificial texture and/or "comfort noise." Stated in other words, the receiving device may use chrominance values to determine what areas of a frame have had texture information filtered there from, and what texture and/or "comfort noise" to apply in these areas. When receiving a plurality of frames of video, the receiving device may also be adapted to provide that artificial texture and/or "comfort noise" is applied stably to surfaces that may move from frame to frame of a video sequence. As a surface including artificial texture and/or "comfort noise" moves from frame to frame, the artificial texture and/or "comfort noise" should move along with the surface.

According to additional embodiments of the present invention, processing as discussed above with respect to FIG. 3 may be performed to provide post-filtering after decoding in a device receiving encoded image and/or video data over a wireless interface. More particularly, encoded digital image and/or video data may be received over a wireless interface. Moreover, the encoded digital image and/or video data can be decoded to provide chrominance values and luminance values for the Current pixel and for the at least one adjacent pixel received at block 301. If classifications and/or parameters for artificial texture information such as "comfort noise" have been transmitted with the image and/or video data, portions of the frame to which artificial texture should be applied can be determined, and the artificial texture can be applied after filtering luminance values from the frame of image and/or video data.

Accordingly, image and/or video data can be pre-filtered according to operations of FIG. 3 before encoding and transmission from a transmitting device, and/or the image and/or video data can also be post-filtered after reception and decoding at a receiving device. By performing both pre-flittering and post-filtering, a number of high frequency artifacts and distortions due to encoding and/or decoding may be reduced. According to some embodiments of the present invention using both pre-filtering and post-filtering, information about the pre-filter type and/or parameters may be transmitted from the transmitting device to the receiving device. The receiving device can then adapt operation of the post-filter to match that of the corresponding pre-filter. The pre-filter type and/or parameters may be transmitted as either user data in the image and/or video bit stream or stored in an encapsulated file format. In addition or in an alternative, image and/or video codec standards may include pre-filter types and/or parameters as a part of the bit stream. Transmission of filter types and/or or parameters may not be required if pre-filters and post-filters are provided according to a common standard. Moreover, exact matching of pre-filter and post-filter types and/or parameters may not be required according to embodiments of the present invention. By using information about the pre-filter parameters and selecting a slightly different filter for the post-filter, sufficient and/or better results may be provided.

Figure 4:
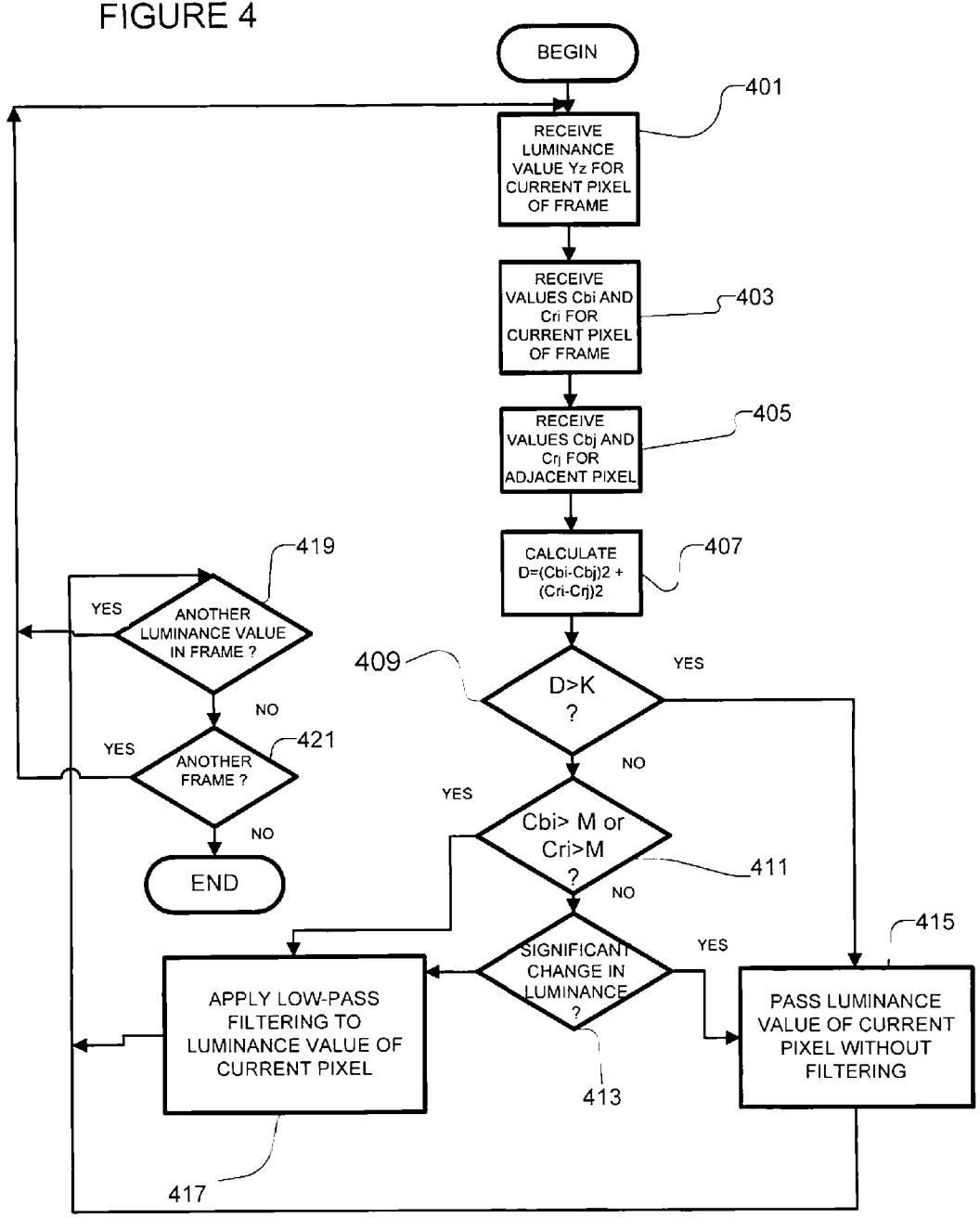

Additional embodiments of filtering according to the present invention are illustrated in FIG. 4. For each pixel of a frame of image and/or video data, a luminance value Y, of the current pixel can be received at block 401, chrominance values Cb, and Cr, of the current pixel can be received at block 403, and chrominance values $Cb_j$ and $Cr_j$ of an adjacent pixel can be received at block 405. A difference D between chrominance values of the current and adjacent pixels can be calculated at block 407 according to the formula provided above at Equation 1. If the difference D between chrominance values' of the current and adjacent pixels is greater than the threshold K at block 409, the luminance value of the current pixel may be passed at block 415 for subsequent processing (such as encoding) without change. A sufficiently large difference between chrominance values of the current and adjacent pixels may be an indication that the current pixel may form part of an edge between objects, surfaces, etc., and edge features may be more accurately preserved by passing the luminance value of the current pixel without low-pass filtering.

If the difference D between chrominance values of the current and adjacent pixels is less than the threshold K at block 409, and either of the chrominance values Cb, or Cr, of the current pixels is greater than the threshold M at block 411: the luminance value of the current pixel can be subjected to low-pass filtering at block 417 before subsequent processing. If the difference D between chrominance values of the current and adjacent pixels is less than the threshold K at block 409 and neither of the chrominance values of the current pixel is greater than the threshold M at block 411, a change in luminance values can be detected at block 413.

If neither of the chrominance values of the current pixel exceeds the threshold M at block 411, the current pixel may be either black or white, and a significant change in luminance values between the current and an adjacent pixel may indicate an edge between back and white regions of the frame. Accordingly, if neither chrominance value of the current pixel exceeds the threshold M at block 411 and there is a significant change in luminance values between the current and an adjacent pixel at block 413, the luminance value of the current pixel may be passed without filtering at block 415 to preserve edges between black and white portions of a frame. If neither chrominance value of the current pixel exceeds the threshold M at block 411 and there is no significant change between the luminance value of a current pixel and an adjacent pixel at block 413, the luminance value of the current pixel may be subjected to low-pass filtering at block 417.

The adjacent pixel for which chrominance values $Cb_j$ and $Cr_j$ are selected for calculation of the difference D at block 407, the adjacent pixel for comparison of luminance values at block 413, and or the adjacent pixel(s) used for averaging at block 417 may be the same or different pixels adjacent to the current pixel. As discussed above, the term current pixel refers to the pixel currently being processed, and the term adjacent pixel refers to a pixel adjacent to the pixel currently being processed. An adjacent pixel may be horizontally, vertically, or diagonally adjacent to the current pixel, and an adjacent pixel may be directly adjacent to the current pixel with no intervening pixels there between. In an alternative, intervening pixels may be present between the current and an adjacent pixel. Moreover, an adjacent pixel may be temporally adjacent to the current pixel in a series of video frames such that the adjacent pixel occupies a corresponding pixel location in a frame previous or subsequent to the frame of the current pixel.

If there is another pixel in the frame to be processed at block 419, a luminance value, can be processed for the next pixel as discussed above with respect to blocks 401-417. If there is another frame to be processed at block 421, luminance values can be processed for the next frame as discussed above with respect to blocks 401-419.

Operations of blocks 415 and 417 may thus provide relatively low strength filtering (block 415) for luminance values and relatively high strength filtering (block 417) for luminance values. In particular, relatively low strength filtering of luminance values may be provided at block 415 by passing the luminance values without change. Relatively high strength filtering may be provided at block 417 by averaging the luminance value for the current pixel with luminance values for one or more adjacent pixels, and the strength thereof may be determined by applying weightings to the current and adjacent luminance values being averaged. Moreover, a strength of filtering applied at block 417 may be varied responsive to other factors such as a level of compression applied by an encoder, and/or to match filtering characteristics of a transmitting or receiving device. For example, relative weightings applied to the luminance values of the current and adjacent pixels being averaged may be changed as a function of a level of compression applied by an encoder and/or to match filtering characteristics of a transmitting or receiving device.

In addition, operations of FIG. 4 may be performed for luminance values of selected pixels or for all pixels in a frame. For example, pixels at an edge of a frame may be processed differently to compensate for the possibility that the definition of an adjacent pixel may not apply when processing an edge pixel. More particularly, the definition of an adjacent pixel may be different when the current pixel being processed is at an edge of a frame. In an alternative, luminance values of edge pixels may not be subjected to filtering. In another alternative, extrapolation may be used to provide adjacent pixel data when the current pixel being processed is at an edge, of a frame.

As discussed above, filtering of image and/or video data may be applied at a transmitting device before encoding and transmitting and filtering may also be applied at a receiving device after decoding to thereby reduce artifacts and/or distortions that may result from encoding and/or decoding. By providing both pre-filtering before encoding and transmitting and post-filtering after decoding, further reductions in high frequency artifacts and/or distortions may be achieved.

Figure 5:
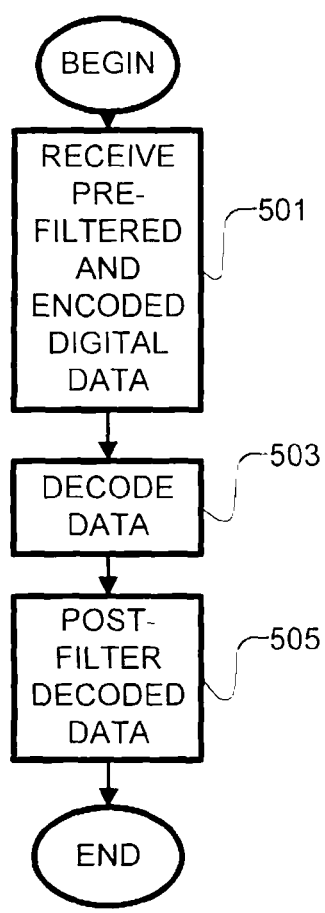

According to additional embodiments of the present invention, a frame of digital image and/or video data may include a plurality of rows and columns of pixels with data for each pixel including a luminance value and a chrominance value. The digital image and/or video data may be pre-filtered and encoded at a transmitting device before transmission, and the pre-filtering may be performed according to a pre-filtering algorithm. As shown in FIG. 5, the pre-filtered and encoded data from the transmitting device may be received at a receiving device at block 501, the pre-filtered and encoded data may be decoded at block 503, and the decoded data may be post-filtered according to a post filtering algorithm at block 505 wherein the pre-filtering and post-filtering algorithms are matched. For example, each of the pre-filtering and post-filtering algorithms may be implemented as discussed above with respect to FIGS. 3 and 4.

According to particular embodiments of the present invention, parameters of the pre-filtering algorithm may be transmitted from the transmitting device, and received at the receiving device. Moreover, operation of the post-filtering algorithm may be adapted according to the parameters of the pre-filtering algorithm received from the transmitting device. By way of example, pre-filtering and post-filtering algorithms may both be implemented as discussed above with respect to FIGS. 3 and/or 4. Other video filters are discussed, for example, in U.S. Pat. No. 5,959,693 to Siu-Wai Wu et al. and in U.S. Pat. No. 6,456,328 to Okada. The disclosures of U.S. Pat. Nos. 5,959,693 and 6,456,328 are hereby incorporated herein in their entirety by reference.

Parameters transmitted from the transmitting device to the receiving device, for example, may include weightings to apply to current and adjacent luminance values when low-pass filtering at block 417, a definition of the adjacent pixel for the calculation of block 407, a numerical value of the threshold K of block 409, a numerical value of the threshold M of block 411, and/or a definition of a significant change in luminance for block 413. The post-filter algorithm may be adapted responsive to one or more of these parameters and/or other parameters.

Figure 6:
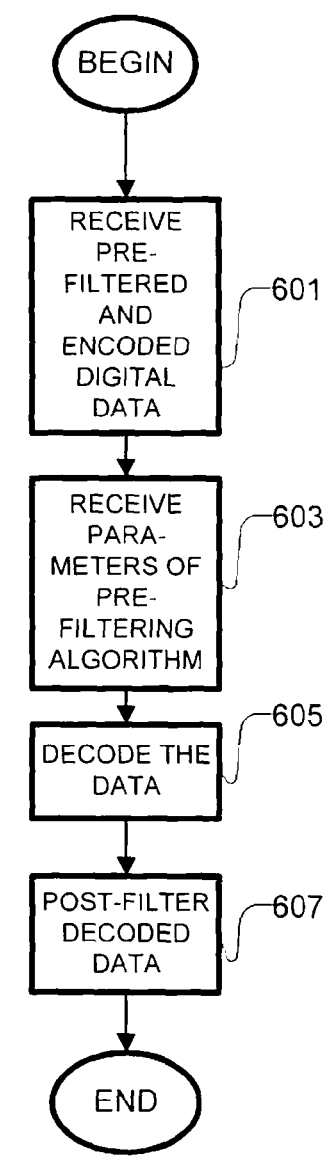

While the pre-filter of the transmitting device and the post-filter of the receiving device may be implemented as discussed above with respect to FIGS. 3 and/or 4, other filtering algorithms may be used. Accordingly, an identification of the pre-filtering algorithm of the transmitting device may be transmitted to the receiving device. The post-filtering algorithm may thus be adapted to match the pre-filtering algorithm responsive to receiving the identification of the pre-filtering algorithm. According to yet additional embodiments of the present invention, a frame of digital image and/or video data may be pre-filtered and encoded before transmission with the data being pre-filtered according to a pre-filtering algorithm, and parameters of pre-filtering may be transmitted from the transmitting device. As shown in FIG. 6, pre-filtered and encoded digital data from the transmitting device may be received at block 601, parameters of the pre-filtering algorithm may be received at block 603, and digital data may be decoded at block 605. In addition, the decoded digital image and/or video data may be post-filtered according to a post-filtering algorithm wherein operation of the post-filtering algorithm is adapted at block 607 according to the parameters of the pre-filtering algorithm received from the transmitting device.

As discussed above, the pre-filtering and post-filtering algorithms may be matched. Moreover, the pre-filtering and post-filtering algorithms may be implemented as discussed above with regard to FIGS. 3 and/or 4 or other algorithms may be used. Other video filters are discussed, for example, in U.S. Pat. No. 5,959,693 to Siu-Wai Wu et al, and in U.S. Pat. No. 6,456,328 to Okada. The parameters of the pre-filtering algorithm received from the transmitting device may include weightings to apply to current and adjacent luminance values when low-pass filtering at block 417, a definition of the adjacent pixel for the calculation of block 407 a numerical value of the threshold K of block 409, a numerical value of the threshold M of block 411, and/or a definition of a significant change in luminance for block 413. The post-filter algorithm may be adapted responsive to one or more of these parameters and/or other parameters.

In addition or in an alternative, an identification of the pre-filtering algorithm of the transmitting device may be transmitted to the receiving device. The post-filtering algorithm may thus be adapted to match the pre-filtering algorithm responsive to receiving the identification of the pre-filtering algorithm. The pre-filter parameters may be received as user data in the image and/or video bit stream or may be stored in an encapsulating file format. Moreover, pre-filter parameters may be included as a part of the bit stream according to image and/or video codec standards. Exact matching of pre-filter and post-filter types and/or parameters may not be required according to embodiments of the present invention. By using information about the pre-filter parameters and selecting a slightly different filter for the post-filter, sufficient and/or better results may be provided. According to still additional embodiments of the present invention, a frame of image and/or video data may include a plurality of rows and columns of pixels. As shown in FIG. 7, a luminance value of a current pixel may be received at block 701, and the luminance value may be filtered at block 703. At block 705, the digital image and/or video data including the filtered luminance value may be encoded, and a rate of compression of the digital data may be varied. Moreover, a strength of filtering of the luminance value can be varied responsive to the rate of compression applied during encoding.

For example, the filtering at block 703 may be implemented as discussed above with respect to FIGS. 3 and/or 4. Other video filters are discussed, for example, in U.S. Pat. No. 5,959,693 to Siu-Wai Wu et al. and in U.S. Pat. No. 6,456,328 to Okada. When filtering as discussed above with respect to FIG. 4, the strength of filtering applied at block 417 may be varied responsive to the rate of compression. Moreover, the encoded digital image and/or video data including the filtered luminance value may be transmitted over a wireless interface.

By varying the strength of filtering based on a level of compression provided during encoding, distortions from filtering may be reduced after a relatively "lossy" compression. An amount of loss during encoding may be determined by a quantization parameter (QP) value. A relatively low QP value may provide relatively low compression and relatively high quality, and a relatively high QP value may provide relatively high compression and relatively low quality. Lower QP values may thus result in increases in compression artifacts in the resulting image and/or video.

A rate control mechanism may change the QP value used during encoding to provide a relatively constant bit rate. Accordingly, information about the QP value currently being used during encoding may be used to vary a strength of filtering of luminance values. More particularly, a strength of filtering of luminance values may be increased when the QP value for encoding increases, and a strength of filtering of luminance values man be decreased when the QP value for encoding decreases. Performance of image and/or video transmission may thus be improved without increasing clearly visible distortions in the resulting image and/or video. Strength of filtering for luminance values may also be varied responsive to motion vectors and/or macro-block skip information.

Additional embodiments of processing digital image and/or video data are illustrated in FIG. 8. As shown in FIG. 8, data for pixels of a frame of digital image and/or video data may be received at block 801, and the data for the pixels of the frame may be filtered at block 803. A portion of the frame to which texture should be applied can be identified at block 805, and the filtered data for the pixels can be encoded at block 807. The encoded and filtered data for the pixels of the frame can be transmitted at block 809, and an identification of the portion of the frame to which texture should be applied can be transmitted at block 811. In addition, a characterization of the texture to be applied can be provided and transmitted, and the characterization may be one of a plurality of predetermined characterizations.

More particularly, identifying a portion of the frame of digital image and/or video data to which texture should be applied may include comparing the filtered data for the pixels of the frame with the unfiltered data for the pixels of the frame and identifying the portion of the frame of digital image and/or video data to which texture should be applied based on comparing the filtered and unfiltered data. Moreover, data for the pixels of the frame may include luminance values and chrominance values, and identifying a portion of the frame of digital data to which texture should be applied may include identifying pixels having similar chrominance values. In addition, the texture may include a variation of luminance values included in the identified portion of the frame to which the texture should be applied. Operations of filtering at block 803 may be performed, for example, as discussed above with regard to FIGS. 3 and/or 4, and receiving data for pixels at block 801 may include receiving pixels from a digital camera. Other video filters are discussed, for example, in U.S. Pat. No. 5,959,693 to Siu-Wai Wu et al. and in U.S. Pat. No. 6,456,328 to Okada.

Figure 9:
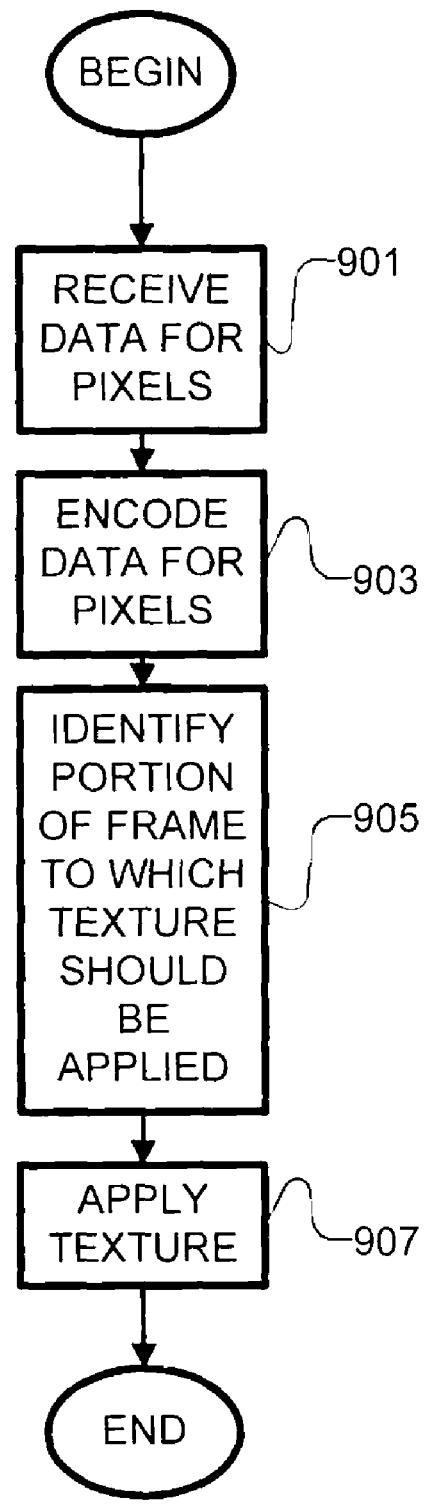

Still additional embodiments of the present invention are illustrated in FIG. 9. As shown in FIG. 9, data for pixels of a frame of digital image and/or video data may be received at block 901, the data for the pixels may be encoded at block 903, and a portion of the frame to which texture should be applied can be identified at block 905. In addition, the texture can be applied to the identified portion of the frame at block 907 after decoding the data for the pixels of the frame. Moreover, the decoded data can be filtered before applying the texture. For example, the decoded data can be filtered according to operations discussed above with regard to FIGS. 3 and/or 4. Other video filters are discussed, for example, in U.S. Pat. No. 5,959,693 to Siu-Wai Wu et al. and in U.S. Pat. No. 6,456,328 to Okada.

More particularly, the characterization of the texture can be received from a transmitting device operating, for example, as discussed above with regard to FIG. 8, and the texture can be applied according to the received characterization. Moreover, the characterization may identify one of a plurality of predetermined textures. "In addition, identifying a portion of the frame to which texture should be applied may include identifying pixels having similar chrominance values.

As discussed above, pre-filtering and post-filtering according to embodiments of the present invention may result in a loss of texture in the processed image and/or video. For example, a surface of an object may have a relatively constant color (i.e. similar chrominance values across pixels making up the surface), but the surface may have a texture resulting from variation in luminance values of pixels making up the surface. Filtering according to embodiments of the present invention, however, may reduce these variations in luminance values across a surface of relatively constant color so that the surface in the processed image and/or video may appear relatively flat and/or smooth and/or may have an unnatural look; Exact details of the original texture may be relatively unimportant for perception of an object including the surface, and the surface of the processes image and/or video may be made to appear more natural by replacing the original texture with an artificial texture (such as a "comfort" noise).

By comparing the original pixel data with the filtered pixel data, textures that have been removed can be classified and/or parameterized. The texture classifications and/or parameters can then be transmitted along with the bit stream and used at the receiving device to reconstruct texture by artificially adding high frequency information such as "comfort" noise to the identified surfaces.

Operations discussed above with respect to FIGS. 3-9 can be implemented in mobile terminals operating according to various protocols. For example and not by way of limitation, mobile terminals according to embodiments of the present invention may provide communications through one or more communications networks such as a WiFi network, a cellular radiotelephone network, a Personal Communication Services Network, a satellite communications network, an ultra wideband network, and/or a Bluetooth network. Operations of FIGS. 3-9 can also be implemented in mobile terminals operating according to different communications protocols according to alternative embodiments of the present invention. In addition, aspects of the present invention may be embodied as methods, systems, and/or computer program products. Accordingly, the present invention may be embodied in hardware and/or in software (including firmware, resident software, micro-code, etc.). The flowcharts of FIGS. 3-9 show architectures, functionalities, and operations of exemplary implementations of software and data used, for example, by a processor 215 to control a communications device according embodiments of the present invention. In this regard, each block may represent a module, segment, or portion of code, which comprises one or more executable instructions for implementing the specified logical function(s). It should also be noted that in some alternative implementations, functions noted in the blocks may occur out of the order noted therein. For example, two blocks shown in succession may be executed substantially concurrently or the blocks may sometimes be executed in the reverse order, depending upon the functionality involved. The present invention has been described above with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks. These computer program instructions may also be stored in a computer-readable memory that can direct a computer or other programmable data processing apparatus to function in a particular manner such that the instructions stored in the computer-readable memory produce an article of manufacture including instructions which implement the functions/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. In the drawings and specification, there have been disclosed typical preferred embodiments of the invention and, although specific terms are employed, they are used in a generic and descriptive sense-only and not for purposes of limitation, the scope of the invention being set forth in the following claims.

What is claimed:

1. A method for processing digital image and/or video data wherein a frame of the data comprises a plurality of rows and columns of pixels, the method comprising:

receiving data for pixels of a frame; filtering the data for the pixels of the frame, wherein the data for the pixels of the frame comprises luminance values and chrominance values, the luminance value of the pixels of the frame is filtered, and the strength of the filtering of the luminance value of the pixels of the frame is based on a comparison of chrominance values of a current pixel and at least one adjacent pixel;

identifying a portion of the frame of data to which texture should be applied, wherein the identifying further comprises identifying pixels having similar chrominance values;

encoding the filtered data for the pixels of the frame;

transmitting the encoded and filtered data for the pixels of the frame; and transmitting identification of the portion of the frame of data to which texture should be applied.

2. A method according to claim 1 further comprising: providing a characterization of the texture to be applied to the identified portion of the frame; and transmitting the characterization of the texture to be applied to the identified portion of the frame.

3. A method according to claim 2 wherein providing a characterization of the texture comprises identifying one of a plurality of predetermined textures.

4. A method according to claim 1 wherein identifying a portion of the frame of data to which texture should be applied comprises comparing the filtered data for the pixels of the frame with the unfiltered data for the pixels of the frame of the data and identifying the portion of the frame of data to which texture should be applied based on comparing the filtered data and unfiltered data for the frame.

5. A method according to claim 1 wherein the texture comprises a variation of luminance values included in identified portions of the frame to which the texture should be applied.

6. A method according to claim 1 wherein receiving data for pixels of a frame of the data comprises receiving the data from a digital camera.

7. A method for processing digital image and/or video data wherein a frame of the data comprises a plurality of rows and columns of pixels, the method comprising:

receiving data for pixels of a frame of the data, wherein the data for the pixels of the frame comprises luminance values and chrominance values, the luminance value of the pixels of the frame is filtered, and the strength of filtering of the luminance value of the pixels of the frame is based on a comparison of chrominance values of a current pixel and at least one adjacent pixel;

decoding the data for pixels of the frame;

identifying a portion of the frame of data to which texture should be applied, wherein the identifying further comprises identifying pixels having similar chrominance values; and after decoding the data for the pixels of the frame, applying the texture to the identified portion of the frame of data.

8. A method according to claim 7 further comprising:

receiving a characterization of the texture to be applied to the identified portion of the frame wherein applying the texture to the identified portion of the frame comprises applying the texture according to the received characterization.

9. A method according to claim 8 wherein the characterization identifies one of a plurality of predetermined textures.

10. A method according to claim 7 wherein the texture comprises a variation of luminance values of pixels included in identified portions of the frame to which the texture is applied.

11. A method according to claim 7 further comprising: filtering the decoded data for the pixels of the frame, before applying the texture.

12. A method according to claim 7 wherein receiving data for pixels of a frame of the data comprises receiving the data over a wireless interface.

13. A method for processing digital image and/or video data wherein a frame of the data comprises a plurality of rows and columns of pixels, the method comprising:

receiving data for pixels of a frame, said data comprising luminance values and chrominance values;

filtering the data for the pixels of the frame;

identifying a portion of the frame of data to which texture should be applied;

encoding the filtered data for the pixels of the frame;

transmitting the encoded and filtered data for the pixels of the frame and identification of the portion of the frame of data to which texture should be applied;

comparing the chrominance values of a current pixel and at least one adjacent pixel;

filtering the luminance value of the current pixel, wherein a strength of the filtering of the luminance value is based on the comparison of the chrominance values of the current and at least one adjacent pixels; and identifying a portion of the frame of data to which texture should be applied by comparing filtered pixel data with unfiltered pixel data.

14. The method according to claim 13, further comprising:

providing a characterization of the texture to be applied to the identified portion of the frame; and transmitting the characterization of the texture to be applied to the identified portion of the frame.

15. The method according to claim 14, wherein providing a characterization of the texture comprises identifying one of the plurality of predetermined textures.

16. The method according to claim 13, wherein identifying a portion of the frame of data to which texture should be applied comprises identifying pixels having similar chrominance values.

17. The method according to claim 13, wherein the texture comprises a variation of luminance values included in identified portions of the frame to which texture should be applied.

18. The method according to claim 13, wherein receiving data for pixels of a frame of the data comprises receiving the data from a digital camera.

* * * * *

UNITED STATES PATENT AND TRADEMARK OFFICE
CERTIFICATE OF CORRECTION

PATENT NO.         : 8,274,577 B2
APPLICATION NO.    : 11/846778
DATED              : September 25, 2012
INVENTOR(S)        : Thorell It is certified that error appears in the above-identified patent and that said Letters Patent is hereby corrected as shown below:

On the Cover Page, item (73), under "Assignee", in Column 1, Line 1,
delete "Telfoanktiebolaget" and insert -- Telefonaktiebolaget --, therefor.

In Column 1, Line 32, delete "wherein" and insert -- when --, therefor.

In Column 3, Line 6, delete "additions" and insert -- addition, --, therefor.

In Column 3, Line 32, delete "invention" and insert -- invention, --, therefor.

In Column 5, Line 6, delete "flame" and insert -- frame --, therefor.

In Column 5, Line 54, delete "embodiments" and insert -- embodiment, --, therefor.

In Column 6, Line 13, delete "107" and insert -- 107, --, therefor.

In Column 8, Line 19, delete "213" and insert -- 213, --, therefor.

In Column 8, Line 63, delete "Similarly" and insert -- Similarly, --, therefor.

In Column 10, Line 67, delete "10 1015" and insert -- 1015 --, therefor.

In Column 11, Line 21, delete "data" and insert -- data, --, therefor.

In Column 12, Line 8, delete "11107," and insert -- 1107, --, therefor.

In Column 12, Line 48, delete "or" and insert -- of --, therefor.

In Column 12, Line 60, delete "1203" and insert -- 1203, --, therefor.

Signed and Sealed this
Twenty-second Day of January, 2013

David J. Kappos
*Director of the United States Patent and Trademark Office*

CERTIFICATE OF CORRECTION (continued)
U.S. Pat. No. 8,274,577 B2

In Column 12, Line 64, delete "example" and insert -- example, --, therefor.

In Column 13, Line 28, delete "pre-tilter." and insert -- pre-filter. --, therefor.

In Column 16, Line 48, delete "examples" and insert -- example, --, therefor.

In Column 18, Line 30, delete "Current" and insert -- current --, therefor.

In Column 18, Line 42, delete "pre-flittering" and insert -- pre-filtering --, therefor.

In Column 24, Line 35, delete "manner" and insert -- manner, --, therefor.

In Column 24, Lines 37-38, delete "functions/act" and insert -- function/act --, therefor.